United States Patent [19]

Chang

[11] 4,301,270
[45] Nov. 17, 1981

[54] CURATIVE FOR CASTABLE POLYURETHANES

[75] Inventor: Eugene Y. C. Chang, Bridgewater, N.J.

[73] Assignee: American Cyanamid Company, Stamford, Conn.

[21] Appl. No.: 213,534

[22] Filed: Dec. 5, 1980

[51] Int. Cl.³ .............................................. C08G 18/32
[52] U.S. Cl. ...................................... 528/64; 252/182
[58] Field of Search ...................... 252/182; 528/64, 66

[56] References Cited

U.S. PATENT DOCUMENTS 3,920,617  11/1975  Hirosawa et al. ..................... 528/64
4,031,049  6/1977  Hirosawa et al. ..................... 528/64

OTHER PUBLICATIONS

Abbott et al, Chem Abstr. 74:88563x, 1971.

Primary Examiner—Maurice J. Welsh
Attorney, Agent, or Firm—Frank M. Van Riet

[57] ABSTRACT

A curative system for castable polyurethanes is disclosed which consists essentially of a mixture of p-di(hydroxyethoxy)benzene and 1,2-bis(2-aminophenylthio)ethane and a method of use therefor.

6 Claims, No Drawings

CURATIVE FOR CASTABLE POLYURETHANES

BACKGROUND OF THE INVENTION

Urethane prepolymers which are produced from such monocyclic isocyanates as 2,4-tolylene diisocyanate; 2,6-tolylene diisocyanate and mixtures thereof are normally cured with aromatic diamines such as methylenebis (0-chloroaniline); 2,6-dichloro-p-phenylenediamine; 1,2-bis(2-aminophenylthio)ethane and the like. Attempts to cure such prepolymers with diol curatives result in the production of polymers having melting points which are too low and poor physical properties.

Urethane prepolymers which are produced from dicyclic isocyanates such as 4,4'-methylenebis (phenylisocyanate) cannot readily be cured with the above-mentioned aromatic diamines because the curing reaction in such a system is too rapid, i.e. the pot life of the polyurethane generally is measured in seconds. Diols have proven to be effective curatives for these prepolymers, however, most diols such as 1,4-butanediol; 1,6-hexanediol; cyclohexanediol; cyclohexanedimethanol etc. produce polyurethanes having reduced hardness in the polymers containing 4–7% NCO. Using these diol curatives, a prepolymer having an NCO content of 8–10% is needed to produce polymers having a hardness of 40–45 Shore D. One commercially available diol curative which results in a reasonably good cure is p-di(hydroxyethoxy)benzene.

Normally, polyurethane elastomers are made by mixing the appropriate isocyanate-terminated prepolymer with the appropriate curative at about 100° C., a temperature at which the prepolymer is fluid and the curative is molten. Reaction begins immediately on manual mixing, and a pot life (the time before the mixture reaches a highly viscous state) of 3–10 minutes is generally desirable so that the mixture can be degassed and poured into a mold. If machine mixing is employed, the pot life can normally be less. Many hours may be needed for the —NCO, —OH (or NH₂) reaction to be completed once the mold is filled, however, but, in practice, the material is demolded as soon as it has acquired sufficient strength to resist breaking, cracking and/or deformation. The demolded material is then "post cured" in an oven, for example, at about 100° C. for about 16 hours, to complete the reaction. Thus, to be economical, the shorter the demold time, the better. The strength of the polymer at demold (while hot) is called the "green strength".

A major disadvantage of the use of p-di(hydroxyethoxy)benzene with the methylenebis(phenyl isocyanate) prepolymers, as compared to the methylenebis(0-chloroaniline)tolylene diisocyanate prepolymer systems is its much weaker "green strength" on demolding. A methylenebis(0-chloroaniline) cured polymer can often be demolded after 20–40 minutes, whereas a p-di(hydroxyethoxy)benzene cured polymer often requires 60–150 minutes to demold.

"Green strength" is, in part, related to the reaction or chain extension rate, and the reaction can be shortened by the use of a catalyst. p-Di(hydroxyethoxy)benzene curing can be advanced to less than 60 minutes demold time, however, by the use of an amine or tin catalysts and still retain an adequate pot life of 4–5 minutes. Further shortening of the demold time reduces the pot life to a point where it is no longer practical.

"Green strength" is a qualitative term and no standard method is available for assessing it. In the present invention, the following definition is used:

The mold is opened and a piece of flashing from the specimen (80–100 mil thick) is folded back against itself immediately, while hot. Ratings are determined as follows:

Poor—Breaks easily, without much bending.
Fair—Breaks when folded back to about ⅛" of touching itself.
Good—Doesn't break when folded back to about ⅛" of touching itself.
Very good—Breaks only when pressure is applied at the fold.
Excellent—Doesn't break even when pressure is applied at the fold.

SUMMARY OF THE INVENTION

The present invention involves the use of 1,2-bis-(2-aminophenylthio)ethane:

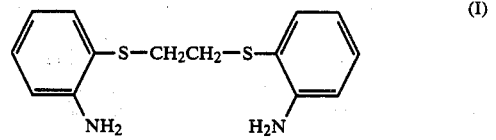

as a co-curative with p-di(hydroxyethoxy)benzene:

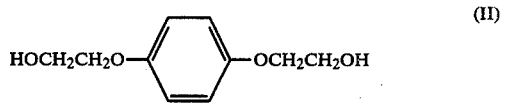

The co-curative system of this invention provides demold times of 30–40 minutes, in some cases 20 minutes, while still maintaining a pot life of 4 minutes when used to cure urethane prepolymers prepared from dicyclic isocyanates. This result is surprising since the reaction rate of most amines is high with such dicyclic isocyanates. Moreover, with most amine curatives, urea is formed which is so insoluble that polymer gelation occurs almost immediately, or solid particles of polymer form in the mixture. With the curative mixture of the present invention, reaction is smooth with no sign of gelation or heterogeniety. Furthermore, tensile properties of the cured elastomer are much improved over the use of p-di(hydroxyethoxy)benzene alone.

DESCRIPTION OF THE INVENTION INCLUDING PREFERRED EMBODIMENTS

As discussed briefly above, the instant invention is directed to a castable polyurethane curative system consisting essentially of (A) from about 65% to about 99%, by weight, of p-di(hydroxyethoxy)benzene and (B) from about 1% to about 35%, by weight, based on the total weight of the system, of 1,2-bis(2-aminophenylthio)ethane. Preferably, the amount of component (A) ranges from about 80% to about 95%, by weight, and the amount of component (B) ranges from about 5% to about 20%, by weight, same basis.

The polyester and polyether based urethane prepolymers which may be cured by the novel curative system of the present invention and in accordance with the novel method hereof are will known to those skilled in the art as are methods and conditions employed for their production.

Exemplary are those polyether-based urethane prepolymers produced by reacting the dicyclic isocyanate with such diols as the polyoxyalkylene adducts of diols and alkylene oxides such as ethylene oxide, propylene oxide butylene oxide and mixtures thereof and the like. The diols useful in preparing these adducts include ethylene glycol, 1,2-propylene glycol, 1,3-propylene glycol, 1,2-butanediol, 1,4-butanediol, 1,6-hexanediol, hydroquinone, biphenol A, and the like.

Typical polyoxyalkylene diols useful herein include polyethyleneether glycol, polypropyleneether glycol, polybutyleneether glycol, polytetramethyleneether glycol, block copolymers, e.g., combinations and polypropyleneether and polyethyleneether glycols; poly 1,2-oxybutylene and polyethyleneether glycols; and poly-1,4-oxybutylene and polyethyleneether glycols; and random copolyether glycols prepared from blends, or sequential addition, of two or more alkylene oxides.

Thus, the polyoxyalkylene diols which can be employed are polyoxyalkylene polymers which have an oxygen/carbon atom ratio from about 1:2 and 1:4 and preferably, an oxygen/carbon atom ratio from about 1:2.8 to 1:4 and no more than 2 terminal hydroxyl groups. The polyoxyalkylene diols generally have an average equivalent weight from about 200 to 3,000 and preferably have an average equivalent weight from about 500 to 2,000. Also diol blends such as a mixture of high molecular weight polyoxyalkylene diols can be used in preparing urethane prepolymers having good properties.

Exemplary polyester-based urethane prepolymers include those produced by the condensation of a dihydric alcohol, generally a saturated aliphatic diol such as ethylene glycol, propanediol-1,2 propanediol-1,3,butanediol-1,3, butanediol-1,4, pentanediol-1,2, pentanediol-1,5, hexanediol-1,3, hexanediol-1-6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic, succinc, glutaric, adipic, pimelic, suberic, azelaic, terephthalic, sebacic, malic, phthalic, cyclohexanedicarboxylic and endomethylenetetrahydrophthalic acids, and the like, and their isomers, homologs, and other substituted derivatives, e.g., chloro derivatives. The linear polyesters used in preparing such urethane prepolymers have molecular weights ranging from about 200 to about 3,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 30 to about 700. When preparing these polyesters, an excess of diol over dicarboxylic acid is generally used.

Examples of dicyclic isocyanates which are generally used in preparing the polyurethane prepolymers of the type which are curable by the curatives of the present invention include 4,4'-methylenebis (phenylisocyanate); biphenylene diisocyanate; 3,3'-dimethyl (-4,4'-biphenylene diisocyanate; 3,3'-dimethoxy-4,4'-biphenylene diisocyanate and the like.

The following examples are set forth for purposes of illustration only and are not to be construed as limitations on the present invention except as set forth in the appended claims. All parts and percentages are by weight unless otherwise specified.

When curing the polyurethane prepolymer in accordance with the examples hereof, both the p-di(hydroxyethoxy)benzene and the 1,2-bis(2-aminophenylthio)ethane are used at 95% of the stoichiometric amount needed to react with all of the available NCO groups of the prepolymer. The prepolymer and the curative are mixed after both are separately heated to 100° C. The catalyst, when used, is tin octoate as a 2% solution in toluene. The mixture is allowed to set in the mold until it gels and becomes firm and non-tacky to the touch. The mold is then closed and pressurized (mold close time), and left under pressure. The mold is then opened and the cured polymer is examined for "green strength" immediately. The thus cured specimens are then placed in an oven at 100° C., after removal from the mold, for 16 hours in order to complete the reaction. Testing is then initiated.

EXAMPLES 1–8

The polyurethane prepolymer used in these examples is a commercially available polyester-based prepolymer produced using 4,4'-methylenebis(phenyl isocyanate) as the dicyclic isocyanate. It has an NCO content of about 6.5%.

The results achieved by curing the above polyester-based prepolymer as described hereinabove are set forth in Table I, below.

TABLE I

| Example | Polyester-based Prepolymer | | | | | | | |
|---|---|---|---|---|---|---|---|---|
|  | 1C | 2C | 3C | 4 | 5 | 6 | 7 | 8 |
| PDHB* | 100 | 100 | 100 | 93.5 | 91.8 | 87.5 | 90 | 85 |
| BAPE** | 0 | 0 | 0 | 6.5 | 8.2 | 12.5 | 10 | 15 |
| Catalyst, % | .002 | .003 | .004 | .003 | .003 | .003 | .003 | .002 |
| Pot life (min) | 6 | 4 | 3.5 | 5 | 4.5 | 4 | 4.5 | 5.5 |
| Closed mold (min) | 11.5 | 9 | 5 | 8 | 9 | 9 | 8 | 11 |
| In mold (min) | 40 | 40 | 40 | 40 | 40 | 20 | 20 | 40 |
| Green strength | Poor | Poor | Fair | V. Good | V. Good | Ex. | Ex. | Ex. |
| Properties |  |  |  |  |  |  |  |  |
| Hardness (Shore D) | 44 | 43 | 43 | 41 | 40 | 40 | 39 | 40 |
| Tensile, psi | 3365 | 3515 | 3939 | 4152 | 4345 | 4599 | 5078 | 5138 |

TABLE I-continued

| | Polyester-based Prepolymer | | | | | | | |
|---|---|---|---|---|---|---|---|---|
| Example | 1C | 2C | 3C | 4 | 5 | 6 | 7 | 8 |
| Elongation, % | 625 | 623 | 625 | 590 | 577 | 613 | 635 | 629 |

Note:
Mole ratio = Weight ratio
93.5/6.5 = 92/8
91.8/8.2 = 91/10
90/10 = 88/12
87.5/12.5 = 85/15
85/15 = 82/18
*PDHB = p-di(hydroxyethoxy)benzene
**BAPE = 1,2-bis(2-aminophenylthio)ethane
C = Comparative

EXAMPLE 9

When the procedure of Example 4 is again followed except that the curative system consists of a mixture of 99% of p-di(hydroxyethoxy)benzene and 1% of 1,2-bis(2-aminophenylthio)ethane, substantially equivalent results are achieved except that the Green Strength is recorded as Good.

EXAMPLE 10

The procedure of Example 8 is again followed except that the p-di(hydroxyethoxy)benzene is used at a concentration of 65% and the 1,2-bis(2-aminophenylthio)ethane is used at a concentration of 35%, excellent results are achieved. The Green Strength is recorded as V. Good.

EXAMPLES 11-13

In these examples, the prepolymer used is a commercially available polyether prepolymer based on polythiodiethanol having a molecular weight of about 1300. It is produced by reaction thereof with 4,4'-methylenebis(-phenyl isocyanate) as the dicyclic isocyanate at a NCO-/OH ratio of 3.5/1. The NCO content thereof is about 7.8%.

The results achieved by curing the above polyether-based prepolymer in the manner described above are set forth in Table II, below.

TABLE II

| | Polyether-based Prepolymer | | |
|---|---|---|---|
| Example | 11C | 12 | 13 |
| PDHB* | 100 | 87.5 | 91.8 |
| BAPE** | 0 | 12.5 | 8.2 |
| Catalyst, % | 0 | 0 | 0 |
| Pot life (min) | 4 | 3'10" | 3'10" |
| Close mold (min) | 9 | 7'30" | 7'30" |
| In mold (min) | 40 | 40 | 40 |
| Green strength | Poor | Ex. | Ex. |
| Properties | | | |
| Hardness (Shore D) | 51 | 50 | 49 |
| Tensile, psi | 2617 | 2948 | 3026 |
| Elongation, % | 352 | 302 | 284 |

*  
** } See Table I

C = Comparative

EXAMPLE 14

When the procedure of Example 12 is employed using a curative system consisting of 1% of 1,2-bis(2-aminophenylthio)ethane and 99% of p-di(hydroxyethoxy)benzene, again excellent results are achieved. The Green Strength is evaluated as Good.

EXAMPLE 15

Following Example 13 except that the curative comprises 35% of 1,2-bis(2-aminophenylthio)ethane and 65% of p-di(hydroxyethoxy)benzene, similar results are achieved except that the Green Strength is designated as V. Good.

EXAMPLES 16-20 (COMPARATIVE)

Attempts are made to admix various amines with p-di(hydroxyethoxy)benzene in such a manner so as to prepare a curative system. In each instance, the amine gels thereby preventing the testing of the mixture.

Example 16: 2,6-toluene diamine
EXAMPLE 17: 2,6-dichloro-p-phenylene diamine
EXAMPLE 18: 4,4'-diaminodiphenyl disulfide
EXAMPLE 19: bis(p-aminocyclohexyl)methane
EXAMPLE 20: trimethyleneglycol di-p-aminobenzoate

We claim:

1. A castable polyurethane curative system consisting essentially of (A) from about 65% to about 99%, by weight, of B-di(hydroxyethoxy)benzene and (B) from about 1% to about 35%, by weight, based on the total weight of the system, of 1,2-bis(2-aminophenylthio)ethane.

2. A curative system according to claim 1 wherein (A) is present in an amount ranging from about 80% to about 95%, by weight, and (B) is present in an amount ranging from about 5% to about 20%, by weight, same basis.

3. A method of curing a polyester or polyether-based urethane prepolymer produced from an aromatic diisocyanate containing two aromatic rings which comprises contacting said prepolymer with the curative system of claim 1.

4. A method of curing a polyester or polyether-based urethane prepolymer produced from an aromatic diisocyanate containing two aromatic rings which comprises contacting said prepolymer with the curative system of claim 2.

5. A method according to claim 3 wherein the aromatic diisocyanate is methylenebis(phenyl isocyanate).

6. A method according to claim 4 wherein the aromatic diisocyanate is methylenebis(phenyl isocyanate).

* * * * *